(12) United States Patent
Chan

(10) Patent No.: US 12,362,565 B2
(45) Date of Patent: Jul. 15, 2025

(54) RESILIENT DECISION SYSTEMS AND METHODS

(71) Applicant: Vit Tall LLC, Orlando, FL (US)

(72) Inventor: Steve Chan, Orlando, FL (US)

(73) Assignee: Vit Tall LLC, Orlando, FL (US)

( * ) Notice: Subject to any disclaimer, the term of this patent is extended or adjusted under 35 U.S.C. 154(b) by 0 days.

(21) Appl. No.: 18/396,986

(22) Filed: Dec. 27, 2023

(65) Prior Publication Data

US 2024/0136820 A1 Apr. 25, 2024

Related U.S. Application Data

(60) Division of application No. 17/189,830, filed on Mar. 2, 2021, now Pat. No. 11,862,977, which is a continuation of application No. PCT/US2020/053458, filed on Sep. 30, 2020.

(60) Provisional application No. 62/915,812, filed on Oct. 16, 2019.

(51) Int. Cl.
| | |
|---|---|
| *H02J 3/24* | (2006.01) |
| *G05B 13/02* | (2006.01) |
| *G05B 13/04* | (2006.01) |
| *G06N 5/045* | (2023.01) |
| *H02J 13/00* | (2006.01) |

(52) U.S. Cl.
CPC .......... *H02J 3/242* (2020.01); *G05B 13/0265* (2013.01); *G05B 13/041* (2013.01); *G06N 5/045* (2013.01); *H02J 13/00006* (2020.01); *H02J 2203/20* (2020.01)

(58) Field of Classification Search
CPC .. H02J 3/242; H02J 13/00006; H02J 2203/20; H02J 3/001; H02J 13/00001; G05B 13/0265; G05B 13/041; G06N 5/045; Y04S 10/40; Y04S 20/00; Y04S 40/12; Y02B 90/20; Y02E 60/00; G06Q 10/04; G06Q 50/06

See application file for complete search history.

(56) References Cited

U.S. PATENT DOCUMENTS

| | | | |
|---|---|---|---|
| 9,563,924 | B2 | 2/2017 | Ghosh et al. |
| 10,476,273 | B2 | 11/2019 | Tyler et al. |
| 10,879,695 | B2 | 12/2020 | Matan et al. |

(Continued)

FOREIGN PATENT DOCUMENTS

| | | | | |
|---|---|---|---|---|
| EP | 3154147 A1 * | 4/2017 | | H02J 1/08 |
| JP | 2008-061417 A | 3/2008 | | |
| WO | WO 2016/004433 A1 | 1/2016 | | |

OTHER PUBLICATIONS

S. Chanda and A. K. Srivastava, "Defining and Enabling Resiliency of Electric Distribution Systems With Multiple Microgrids," in IEEE Transactions on Smart Grid, vol. 7, No. 6, pp. 2859-2868, Nov. 2016, doi: 10.1109/TSG.2016.2561303. (Year: 2016).*

(Continued)

*Primary Examiner* — Mohammad Ali
*Assistant Examiner* — Dhruvkumar Patel
(74) *Attorney, Agent, or Firm* — Woodard, Emhardt, Henry, Reeves & Wagner, LLP

(57) ABSTRACT

Disclosed are systems and methods for utilizing a unique elastic command and control architecture to incorporate certain resiliency qualities in power grid management and outage mitigation.

20 Claims, 7 Drawing Sheets

(56) References Cited

U.S. PATENT DOCUMENTS

| | | | |
|---|---|---|---|
| 2014/0163759 A1 | 6/2014 | Anderson et al. | |
| 2014/0365022 A1* | 12/2014 | Ghosh | G06Q 50/06 700/291 |
| 2015/0303691 A1 | 10/2015 | Forbes, Jr. | |
| 2016/0156188 A1 | 6/2016 | Baba et al. | |
| 2016/0204606 A1* | 7/2016 | Matan | H02J 13/00028 700/291 |
| 2018/0316222 A1* | 11/2018 | Shim | H02J 13/00034 |
| 2018/0366978 A1* | 12/2018 | Matan | G05B 19/042 |

OTHER PUBLICATIONS

Latif-Shabgahi, Soureh. "An integrated voting algorithm for fault tolerant systems." Proc. International Conference on Software and Computer Applications (IPCSIT). vol. 9. 2011. (Year: 2011).*

English abstract for EP 3 154 147 A1 obtained from Google Patents on Dec. 27, 2023.

English abstract for JP2008-061417 A obtained from Google Patents on Dec. 27, 2023.

International Search Report and Written Opinion issued in PCT/US2020/053458, dated Jan. 19, 2021, 16 pgs.

* cited by examiner

RESILIENT DECISION SYSTEMS AND METHODS

CROSS-REFERENCE TO RELATED APPLICATIONS

This application is a divisional of U.S. application Ser. No. 17/189,830, filed Mar. 2, 2021, entitled "Resilient Decision Systems and Methods," now U.S. Pat. No. 11,862,977 issued Jan. 2, 2024, which is a continuation of International Patent Application No. PCT/US2020/053458, filed Sep. 30, 2020, entitled "Resilient Decision Systems and Methods," which application claims priority to U.S. Provisional Patent Application Ser. No. 62/915,812, filed Oct. 16, 2019, entitled "Resilient Decision Systems and Methods," all of which are incorporated by reference herein.

BACKGROUND

Power distribution systems, also known as electrical power grids, are used to transmit power from generators to consumers. Over time, power distribution systems have become increasingly complex and more difficult to govern, resulting in increased monitoring needs. The present disclosure deals with systems and methods for monitoring and controlling the nodes in an electrical grid. A distribution system may employ several generators, each of which can be adjusted independently. This can lead to phase differences between a given generator and the wider distribution system, whereby the generator will attempt to correct itself such that it is synchronized (in phase) with the rest of the distribution system. The power used to synchronize the generator may flow from the wider system and therefore stress and/or overload the individual generator in some situations. Likewise, other parts of the network that are subject to multiple generator loads which are significantly out-of-phase may be damaged. Therefore, it is important to synchronize each generator with the rest of the power distribution system. This is generally done through enhanced phase measurement units (PMUs), sometimes known as synchrophasors, which reports the amplitude, frequency, and phase information of electricity flowing through the system at a particular location to a remote site for analysis.

Prototypical command and control (C2) architectures, such as within the energy ecosystem, typically involve headquarters (HQ)-related node data and remote, distributed hyper-locale (specific to the ambient conditions) node data that need to be effectively fused so as to create actionable quality data. Under default conditions, the headquarters-related node and the involved remote, distributed hyper-locale node exist within some type of enclaved network. These traditional command and control (C2) architectures are hierarchical in nature, so the challenge is to transition to more resilient architectures, which will continue to provide requisite capabilities amidst system failures, anthropogenically-induced failures, and nature-induced failures. For example, blackouts (i.e. electrical power outage) and/or rolling brownouts (intentional or unintentional drop in voltage in an electrical power supply system) are clear indicators of failures for the hitherto conventional C2 architectures. The involved metrics are quite clear: either the power is on or off, and the associated resiliency architecture either works or does not work.

Accordingly, there is a need for resilient energy infrastructure including the following aspects: (1) incorporate outage mitigation improvements; (2) improve operational and maintenance standards and practices to ensure expeditious restoration of energy supply; (3) adapt to withstand adverse conditions and disruptive events; and (4) detect disturbance events and identify the causes and/or source locations for such events. Utilities within the energy ecosystem have struggled with implementing more resilient architectures amidst these new resilience compliance mandates.

SUMMARY

The disclosure relates to resilient and elastic decision systems for monitoring and controlling electrical distribution systems, e.g., a smart grid. The system may include a distribution node network including a command node and candidate nodes among the node network. The candidate nodes develop historical baseline and heuristic decision models based on a variety of received data of the electrical grid. In non-exigency circumstances, the command node may distribute commands throughout the network using preset hierarchical communication pathways. However, in exigency circumstances, the decision systems may elect partner nodes from the candidate nodes in localized groups of nodes, and the partner nodes then assume command messaging within the localized node groups. In some instances, the partner nodes may, but do not necessarily, correspond to substations in the electrical grid.

Inventive methods relate to evaluating the electrical grid on a local level and adjusting local equipment based on such evaluations and decisions, wherein the local decision model is based on an accumulation of historical data. In an embodiment, the methods include executing a compressed decision path based on a limited state input and an uncompressed decision path based on a series of state inputs. The outputs from at least two redundant classifiers within the decision paths may be arbitrated by voting algorithms. The decision path output is selected based on the available decision cycle time and an apparatus in the electrical grid may be adjusted to implement the decision output. In some variants, each of the outputs from the compressed decision path and the uncompressed decision path may be evaluated or validated by comparison to the output from a classifier used in the other decision path, thus providing a third classifier within each of the extended decision paths. In essence, the paradigm is an edge analytic decision-support engine that fuses operational (e.g., SCADA), non-operational (e.g., DFR), and situational awareness data (e.g., PMU) into extended SCADA data.

The disclosed methods also relate to the development and operation of multi-partner enclaves (MPEs) as an elastic command structure in an electrical grid. The method may comprise selecting a partner node for a given subset of nodes based on proximity or other factors, establishing a heuristic model within the partner node, updating the heuristic model based on non-operational historical data, providing operational data to the partner node, evaluating the operational data within the partner node to identify an adjustment to the electrical grid, and sending a command to implement the adjustment to an electric device in the enclave. Key nodes may be selected based on consumer quantity or type and the communication and evaluation of the state data may prioritize maintenance and service of the key nodes.

The disclosure also provides enhanced methods for detecting and identifying anomaly events, such as oscillations and harmonics, which can lead to system instability, in conjunction with the command and control systems and methods described herein.

DETAILED DESCRIPTIONS

Figure 1:
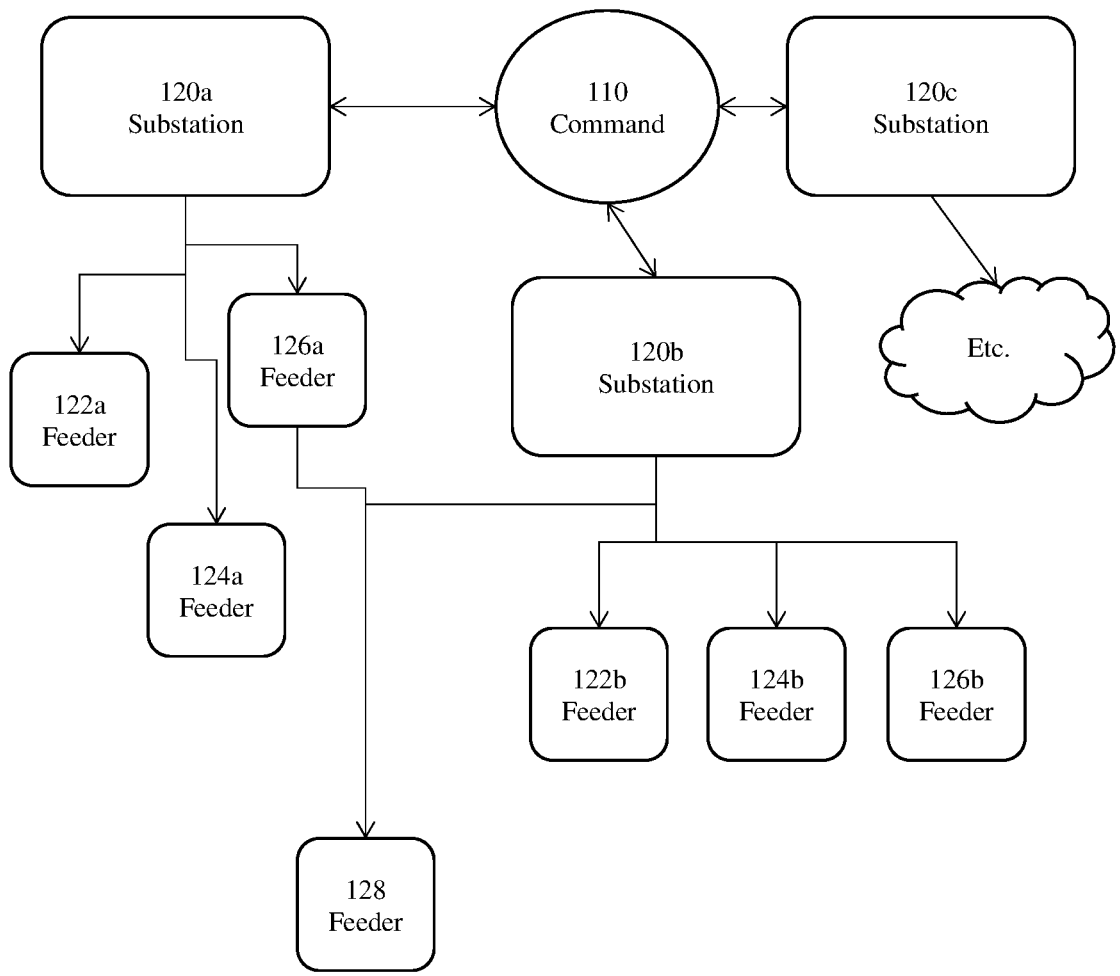
FIG. 1 is a diagram of a prototypical command structure for an electrical grid.

An electrical grid is defined as, among other components, an electrical power system network comprised of generating station(s) (a.k.a. power plant), utilities, substations, feeders, consumer(s), etc. Between the ends (i.e. generating station, consumer), electrical power may flow through substations at various voltage levels. Ideally, this is architected so as to minimize the power loss along the generation-transmission-distribution pathway by maintaining a higher voltage whenever possible.

An electric utility is a company within the electric power industry (often a public utility) that engages in any of electricity generation, transmission, and/or distribution as pertains to an electric grid. A distribution utility constructs and maintains the distribution wires connecting the transmission system to the final electricity consumer.

Within an electrical grid, substations are a key component of the constitutive generation, transmission, and distribution systems comprising the involved grid. The purpose of a distribution substation is to transfer power from the transmission system to the distribution system of an area. In addition to transforming voltage, distribution substations also regulate voltage (although for long distribution lines, i.e., circuits, voltage regulation equipment may also be installed along the circuits) and isolate faults. Several distribution substations (DS) may comprise a distribution utility.

"Feeders" represent the power lines through which electricity is transmitted within power systems. A distribution feeder represents one of the circuits emanating from a DS, and it transmits power from a DS to the designated distribution points serving electricity to the consumer. Typically, there are several distribution feeders per DS. A feeder may segue into primary and/or lateral distribution lines which carry medium voltage power to distribution transformers located near the electricity consumer. Distribution lines may include two or three wires which carry, respectively, two or three phases of current.

A transformer is an electrical device consisting of two or more coils of wire that transfer electrical energy between two or more circuits by means of a varying magnetic field (a varying current in one coil of the transformer produces a varying magnetic flux, which, in turn, induces a varying electromotive force across a second coil wound around the same core). A distribution transformer provides the final voltage transformation within an electric power distribution system.

The electricity consumers are served with single-phase power in the form of secondary distribution lines (SDLs) which carry lower voltage power to the electricity consumer.

As used herein, the concept of locality or proximity in an electrical grid may refer to: (1) physical proximity, e.g., the distance between items in the real world; (2) network proximity, e.g., the number of communication links between items and/or the transmission times associated with such communication links; (3) grid proximity, e.g., the number and type(s) of electrical distribution devices between items; and/or (4) combinations thereof. For example, two given secondary lines may be located in close physical proximity (for example on adjacent streets) but be considered to have a larger distance due to an elongated grid proximity if they are supplied by different primary distribution lines or substations.

Under a conventional or prototypical HQ C2 Architecture, the substantive portion of data (e.g. Non-Operational Data, Situational Awareness Data) is often not utilized; paradoxically, this information is particularly vital under exigency circumstances. By way of example, data is often classified into various data categories by performance needs: "Non-Operational Data" may be more historical and forensic in nature; "Situational Awareness Data" may be useful for further appraising operational data, but it has not yet been fully integrated with Operational Data; "Operational Data" is indicative in nature and used for decision-making, and may provide the immediate performance expected of quasi-real-time data. For example, the grid may operate a supervisory control and data acquisition (SCADA) system which operates as a conventional C2 network.

For example, an electrical utility may utilize phasor measurement unit (PMU) data, weather data, meter data (measuring individual customer usage or aggregated usage in an enclave), electricity market data, SCADA, and Digital Fault Recorder (DFR) data in monitoring the grid, state estimation, event detection, and control operations for distributing electricity throughout the grid. Each of these types of data may be generated and/or received at different frequencies. For example PMU data may be sampled at a distribution point in the grid at 512 times per cycle, which in a typical 50 or 60 Hz AC system (i.e., 50 or 60 cycles per second, respectively), is in the range of about $10^3$ Hz-$10^4$ Hz. At the other extreme, market pricing of electricity may only be generated a few times a day, such as once per hour during business hours, for sampling frequency on the order of $10^{-4}$ Hz. Other examples include weather data sampling up to about 1 Hz and meter data sampling up to about $10^{-2}$ Hz (e.g., around 1 sample per minute or two). Evident from these examples is that the volume of data generated from each source over a given time period varies significantly; accordingly, the transfer, storage, and analysis of higher-resolution data (such as PMU data) to a central HQ C2 node may be impractical. Furthermore, the different types of data may not be supplied to and/or generated at each node in the grid. For example and without limitation, pricing may be sampled at a single headquarters node, weather and PMU data sampled at substations, and meter usage sampled at the transformer level.

In application, DFR data is construed as non-operational data and can, over time, be used to take corrective action, thus contributing to a historical model. PMU data has the highest resolution, is the most voluminous, and is more predictive and real-time, but is considered situational awareness data because the SCADA system, generally operating at a lower time resolution, is used operationally. Likewise, weather data and sensors can be used as situational awareness data. As described herein, a "state input" or "state data" may refer to the quasi-real-time operational data of an electrical component device or group of devices, or even the entire electrical grid.

Under exigency situations, this traditional solitary command network quickly devolves as "partner" nodes are often needed. If the exigency is limited, only one "partner" enclave may be needed. However, if the exigency is large-scale and widespread, the needs may be varied, and, consequently, multi-partner enclaves (MPE) may be needed. Accordingly, during non-exigency situations, the HQ C2 can function in a certain way; yet, during certain exigency situations, the involved HQ C2 architecture must be able to devolve into an MPE structure. Preferably, during non-exigency situations, the partners and/or partner candidates within the network continuously update and tune their internal decision systems as both real-time operational data and the commands and system adjustments from the HQ C2 are received. Thus, over time, the normal operational preferences of the utility operator and/or the HQ C2 node may become embedded in the historical baseline model and the heuristic model implemented at each of the MPE partner nodes. Accordingly, even when the hierarchical command structure devolves into the MPE network, the interests of the original HQ C2 remains prominent in managing each partner's enclave.

As discussed herein, the heuristic model is a predilection formed at a hyper-local level in an MPE given an accumulation of Non-Operational Data, Situation Awareness Data, and Operational Data experiences. Based on this repertoire of data at the local level, the ambiguity in any situation may be lowered, providing a quick decision based on the pre-formed deep beliefs embedded in the model.

Referring to FIG. 1, an electrical grid 100 is illustrated which can be represented as a network of nodes, with command node 110 in communication with at least substation nodes 120a, 120b, and 120c. As illustrated, the substation 120a supplies electricity to feeders 122a, 124a, 126a, which be primary distribution lines, lateral distribution lines, or secondary distribution lines, as discussed above, and may include transformer(s) at appropriate locations. Similarly, substation 120b supplies feeders 122b, 124b, 126b, etc., and substation 120c may be similarly arranged (not shown). In some instances, the distribution system may be such that a given feeder may be, directly or indirectly, within the downstream distribution network of two substations, such as feeder 128. In FIG. 1, each of the substations and feeders may be considered distribution nodes within the domain of the electrical grid. In a prototypical command structure, under non-exigency circumstances, the command node 110 may have direct interaction with subsidiary nodes such as substations 120a, 120b, 120c, for example via a fiber optic communications network, which may relay commands through preset hierarchical pathways to the nodes and equipment further downstream in the distribution system as in a traditional SCADA system. It is understood that in other embodiments (not shown), the command node may be in direct communication with subsidiary nodes which are not substations, and the non-limiting example in FIG. 1 is for purposes of illustration only.

Figure 2:
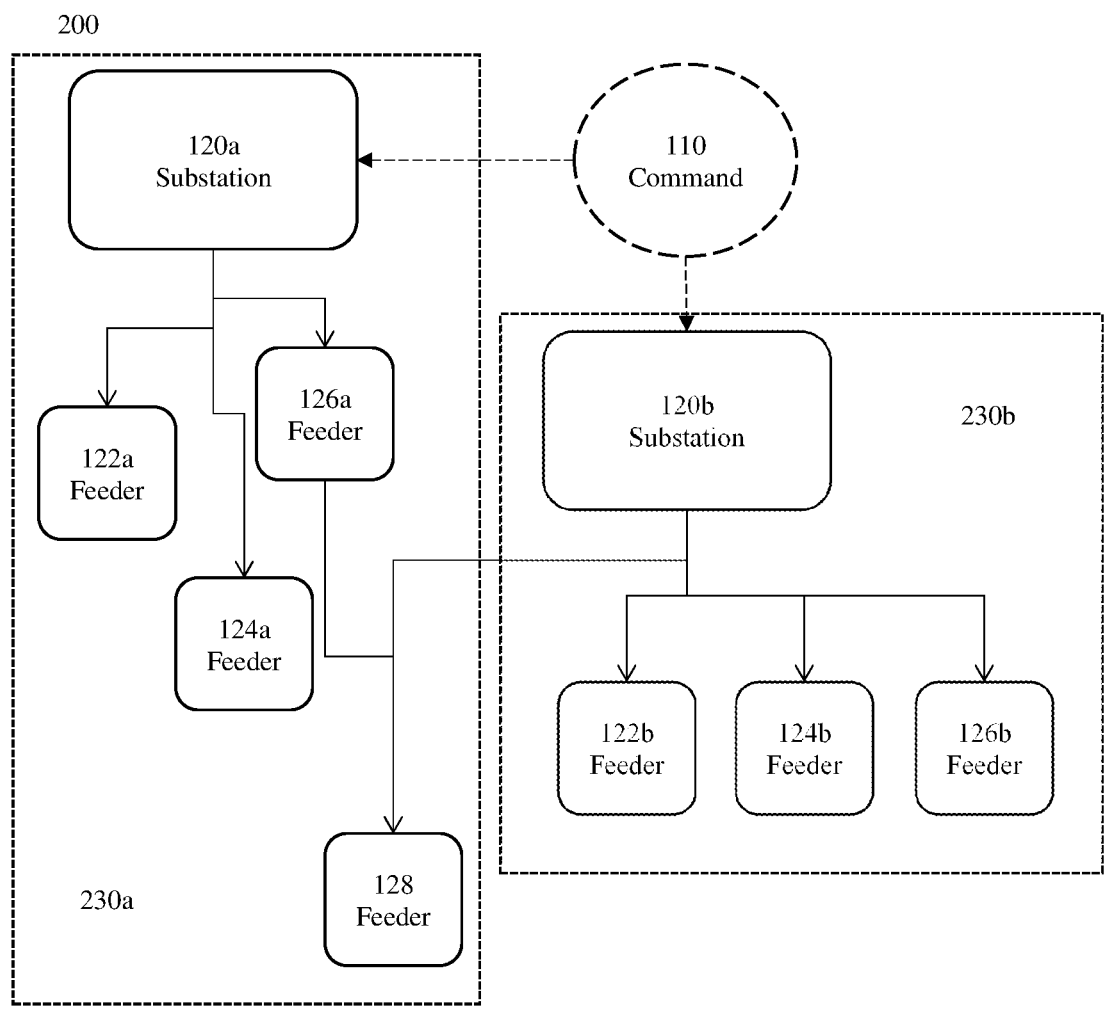
FIG. 2 is a diagram of a multi-partner enclave (MPE) decision system derived from the structure of FIG. 1.
Figure 3:
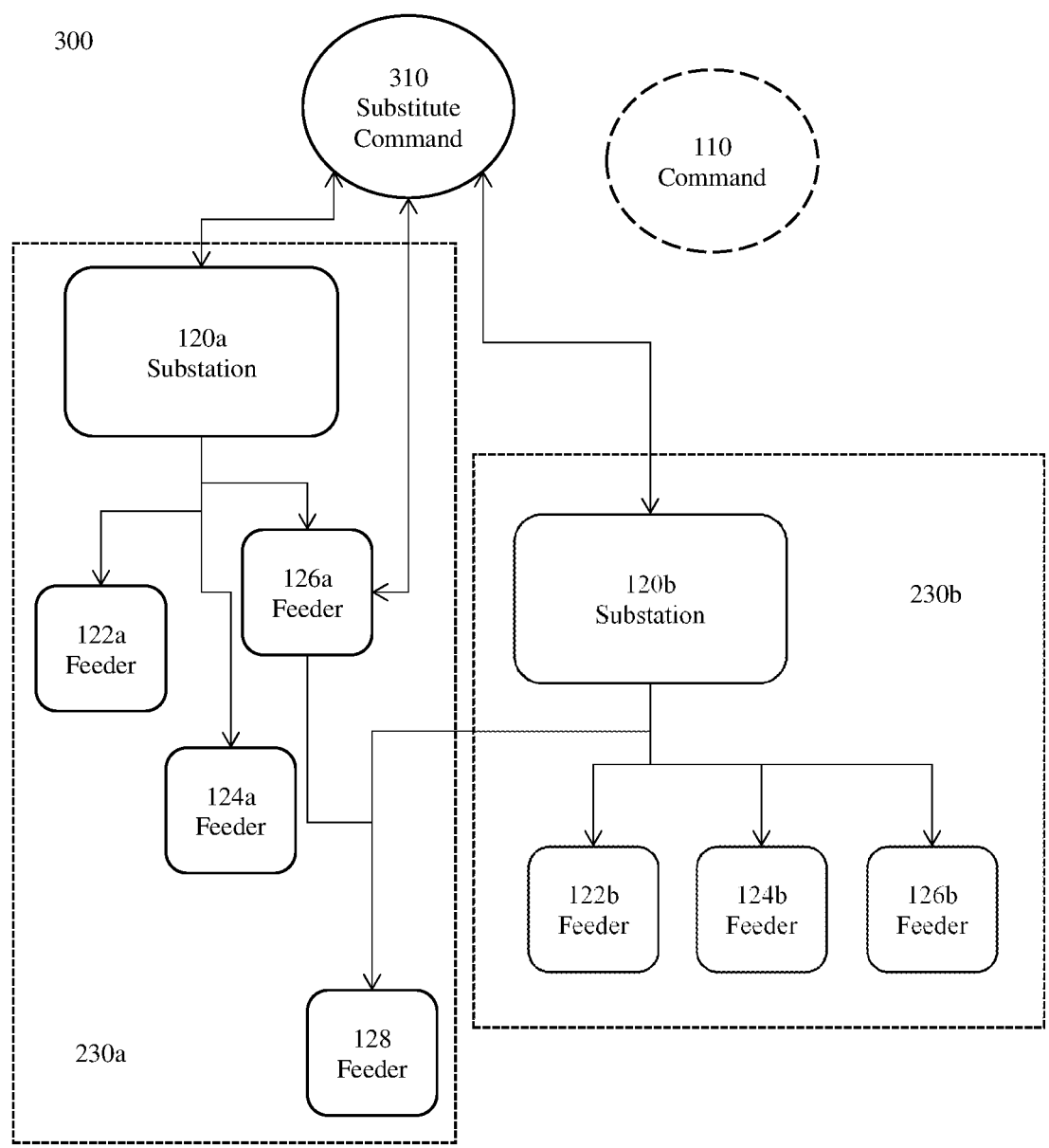
FIG. 3 is a diagram of a variant decision system derived from the systems of FIGS. 1-2.

FIG. 2 illustrates a multi-partner enclave (MPE) decision system 200 derived from the structure of FIG. 1. As seen in FIG. 2, the command node 110 is eliminated from control hierarchy, as indicated by the dashed lines. This situation may occur in the event of an outage or other exigency condition. The decision system may be configured to identify localities of distribution nodes such as groups or enclaves 230a and 230b, shown in dotted lines. The command functions of the system then may devolve to partner nodes elected from each of the enclaves 230a and 230b. For example, the substations 120a and 120b may serve as partner nodes for enclaves 230a and 230b, respectively. (For ease of illustration, substation 120c is omitted from FIG. 2 and subsequent drawings.) The system may define new hierarchical communication pathways from each of the partner nodes to its respective locality of distribution nodes. In FIG. 3, a substitute command node 310 is inserted into the variant system 300 derived from the systems of FIGS. 2 and 1. As seen in FIG. 3, substitute command node 310 may distribute commands to the node network through former partners of the MPE network (such as, for example, substations 120a and 120b) and/or be in direct communication with nodes further downstream (such as, for example in FIG. 3, feeder 126a and its downstream nodes such as feeder 128).

Figure 4:
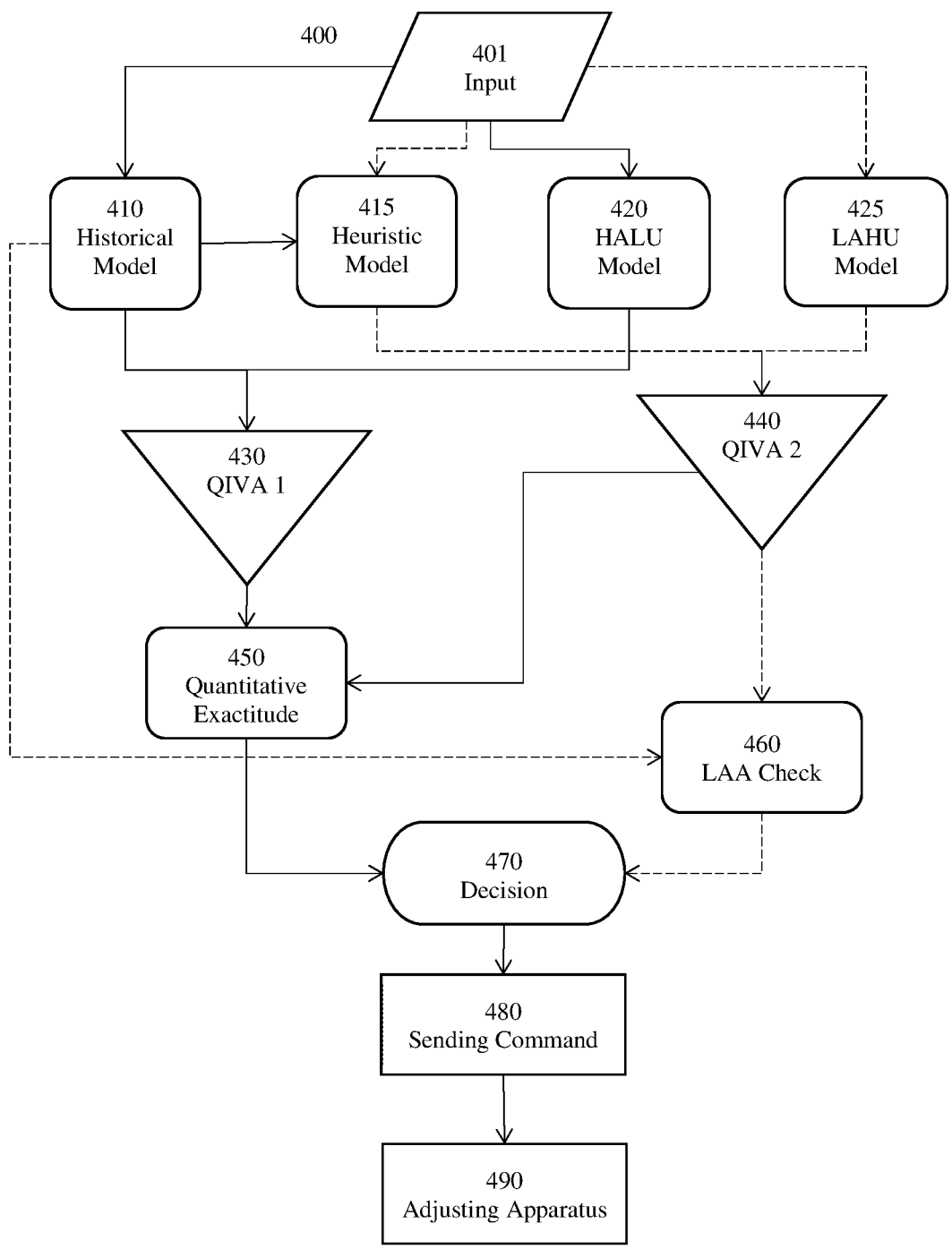
FIG. 4 is a diagram of a decision engine and method implemented within the systems of FIGS. 1-3 for adjusting the properties of the electrical grid.

More specific decision methods implemented within the command and/or partner nodes are illustrated in FIG. 4. The decision support engine 400 counterbalances uncertainty with ambiguity. Under tight time constraints, it accepts higher uncertainty (i.e., sparse data) given the condition of lower ambiguity (this situation occurred before within the historical data). Conversely, if there is higher ambiguity (this situation has not occurred within the historical data), the system does not accept higher uncertainty; instead, it uses more data to lower uncertainty. Hence, the Lower Ambiguity, Higher Uncertainty (LAHU) and Higher Ambiguity, Lower Uncertainty (HALU) decision paradigms are embedded in the decision engine. By way of explanation, input data 401 is ingested by two disparate pathways: (1) uncompressed decision cycles (UDC), and (2) compressed decision cycles (CDC). In FIG. 4, up to decision step 470, the uncompressed decision cycle path is shown in solid lines, and the compressed decision cycle path is shown in dashed lines. The two paths merge at decision step 470.

For UDC (solid lines), the data is passed to the Non-Operational Data (e.g. historical baseline) module 410 as well as a HALU model 420 (i.e. more data is desired). Accordingly, in the UDC path, a series of state data and/or data from multiple sources may be ingested. In contrast, for CDC (dashed lines), data will be passed to the Deep Belief Heuristics module 415 and a LAHU module 425. The LAHU module 425 may be a near pass-through algorithm providing for minimum computation time via numerical method accelerants. For the UDC pathway, the historical baseline module 410 and HALU 420 pass their votes to a modified Q-Input Voting Algorithm (QIVA) module 430, whose output is then optionally passed along to a Quantitative Definiteness or Quantitative Exactitude Algorithm for Fault Tolerant Systems (QEAFTs) variant step 450 for further processing prior to a decision 470 being reached. (A Q-Input Voting Algorithm is a variant of various N-Input Voting Algorithms, for example as described in A. Karimi, F. Zarafshan, and A. Ramli, "A Novel N-Input Voting Algorithm for X-by-Wire-Fault-Tolerant Systems," The Scientific World Journal, October 2014. A QEAFT may be a variant of voting algorithm employing a comparator threshold, for example as described in S. Latif-Shabgahi, "An Integrated Voting Algorithm for Fault Tolerant Systems," 2011 Intl. Conf. Software and Computer Apps., Intl. Proc. of Comp. Sci. and Inf. Tech., Vol. 9, pp. 1-17, 2011.) For the CDC pathway, the heuristics module 415 and the LAHU 425 pass their votes down a fast track pathway that has its own voting module 440, and optionally an additional "Lower Ambiguity Accelerant (LAA)" step 460 comparing to an output of the historical model 410. As seen in FIG. 4, the QEAFT step 450 may consider the output of the CDC voter 440. A resultant decision 470 may be selected based on the available decision cycle time, communicated to the network in the sending command step 480, and implemented by adjusting an apparatus step 490 in the electrical grid.

Figure 5:
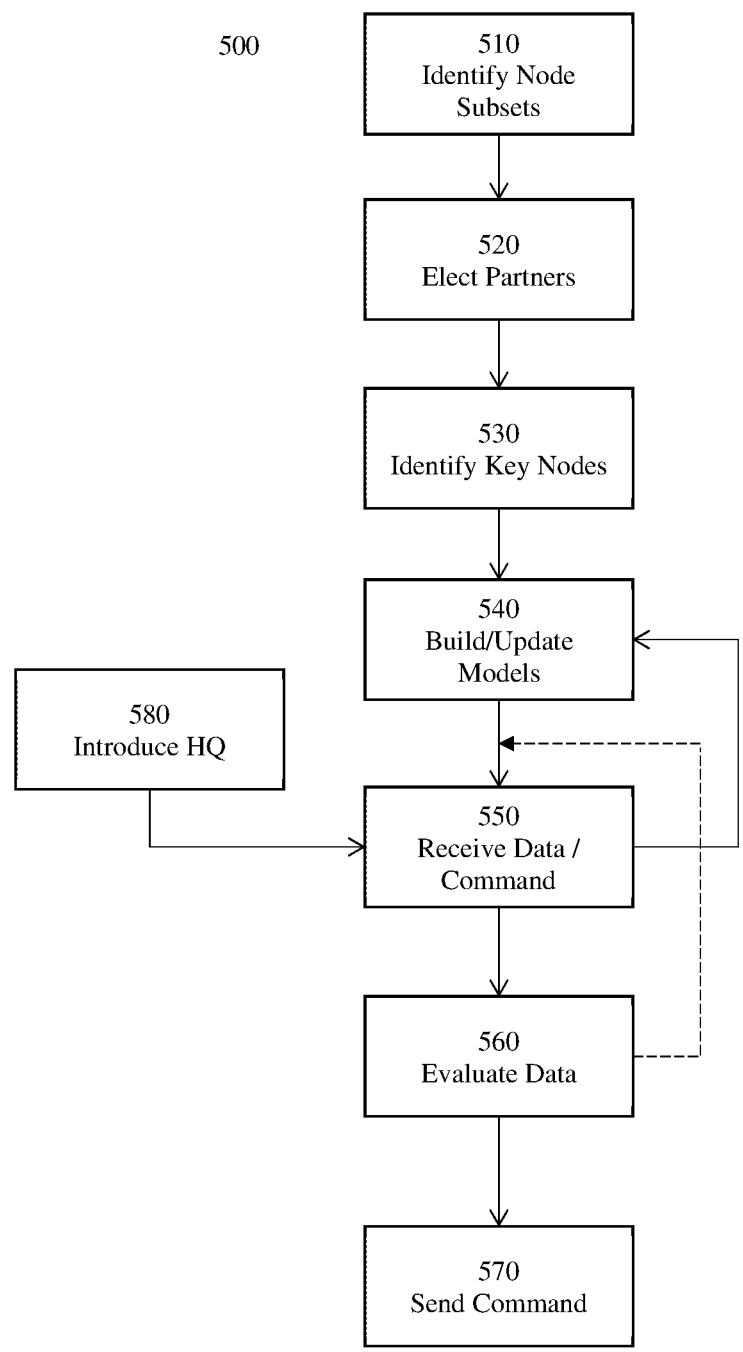
FIG. 5 is a diagram of a method for developing an MPE structure for use in the systems and methods of FIGS. 1-4.

FIG. 5 illustrates a process 500 for developing an MPE structure for use in the systems and methods described above. The method functions in a domain of nodes within the electrical power grid. As illustrated, the method includes step 510 of identifying node subsets within the domain The subsets may be selected based on proximity, including physical and/or grid proximity as discussed above. Preferably, subsets are selected to generally correspond with substations or a proximate group of feeder lines serviced by a single substation. In step 520, a partner node is elected for each subset group. Again, such election or selection may be based on proximity to the subset of grouped nodes. In optional step 530, key nodes in the domain may be identified. Such key nodes may service a comparably large number of customers, or for example may service particular prioritized types of customers of critical importance, such as hospitals, traffic signals, or airports. In step 540, the historical and/or heuristic models are built based on a historical set of non-operational data and/or situational awareness data. In step 550, the partner node receives operational data and/or situational awareness data from its node subset. This data is used to update and/or tune the models in a return to step 540 as well as passed to evaluation step 560, which may proceed according to the methods described above in connection with FIG. 4 to identify an adjustment an electrical property in the subset nodes. In step 570, the partner node sends a command to one of the other nodes in the subset. In some embodiments, the command is sent directly to a key node for adjustment of an electrical device at the key node. Optionally, a new headquarters node may be introduced at step 580 and provide additional commands and/or data to the partner node in step 550. In addition to sending the adjustment command, the process can return to receiving operational data and commands in step 550, thereby continuously updating the decision models and evaluating the system state for potential adjustments.

Performance indices of electricity supply services system reliability include the following: System Average Interruption Frequency Index (SAIFI) (the average number of interruptions that a customer would experience during the measurement period); System Average Interruption Duration Index (SAIDI) (the average duration of interruption for each customer served during the measurement period); Momentary Average Interruption Frequency Index (MAIFI) (the average number of times a customer experiences a momentary interruption during the measurement period); and Customer Average Interruption Duration Index (CAIDI) (the average length of a sustained customer interruption during the measurement period), which may be calculated simply as SAIDI divided by SAIFI.

Among the discussed indices used to measure distribution system reliability, the System Average Interruption Frequency Index (SAIFI) can be calculated as shown:

$$SAIFI = \frac{\sum N_i}{N_T}$$

where $N_i$=Total number of customers interrupted for each sustained interruption event and $N_T$=Total number of customers served.

Another index is System Average Interruption Duration Index (SAIDI), which can be calculated as shown:

$$SAIDI = \frac{\sum (r_i \times N_i)}{N_T}$$

where $r_i$=Restoration time (in minutes), $N_i$=Total number of customers interrupted for each sustained interruption event, and $N_T$=Total number of customers served.

Another index is Customer Average Interruption Duration Index (CAIDI), which can be calculated as shown:

$$CAIDI = \frac{\sum (r_i \times N_i)}{\sum N_i}$$

where $r_i$=Restoration time (in minutes) and $N_i$=Total number of customers interrupted.

As $N_i$ plays such an instrumental role with regards to the SAIFI, SAIDI, and CAIDI calculations, it is important to examine the key distribution utility components affecting $N_i$. The identification of key nodes based on number of customers served is thus a useful metric for selection of key nodes for increased monitoring and management and/or weighting in decision systems and methods. By comparison, in a conventional command structure, the key nodes may be identified by manual input without a rigorous evaluation of the true impacts on performance indices, leaving the entire involved distribution network exposed and perpetuating a misunderstanding of how to best react during an outage or other exigency event.

For example, consider an exemplary electrical grid with two distribution substations DS1 and DS2 and six feeders F1-F6 serviced by the substations with the customer counts in Table 1:

TABLE 1

| Feeder | DS1 | DS2 |
|---|---|---|
| F1 |  | 800 |
| F2 | 5000 |  |
| F3 |  | 715 |
| F4 | 8050 |  |
| F5 | 1250 |  |
| F6 | 3000 |  |
| Total | 17300 | 1515 |

In Table 1, $N_T$=17300+1515=18815. In a traditional command structure, there is a natural tendency to select the substations as key nodes. However, in the example of Table 1, a failure of DS2 would provide a SAIFI score of 1515/18815=8.05%. On the other hand, failure of feeders F2, F4, or F6 would have SAIFI scores of 56.72%, 42.79%, and 15.94%, respectively, substantially greater than the interruption impact of a failure of substation DS2 Similarly, the feeder F5, although supplied by substation DS1 like the other impactful feeder nodes, supplies a relatively smaller number of customers and has an even lower SAIFI score than DS2 (6.64%). Accordingly, monitoring and prevention resources may be better spent in designating feeders F2, F4, and F6 as key nodes rather than DS1, DS2, or F5. (Of course, as described above, there may be other considerations that would justify designating DS2 and/or F5 as a key node, for example supplying a local hospital or other prioritized infrastructure.) As seen above, the interruption durations $r_i$ also affect the SAIDI and CAIDI equations. It should be noted that the example of Table 1 is simplified from a real-world implementation, which may involve dozens or a few hundred of distribution transformers with varying customer counts to service a similar population size, and the key nodes may be selected from multiple levels of the distribution architecture, including substations, feeders, transformers, and/or combinations of components. Additional improvements may be achieved by delegating key node identification to the local partners in an MPE network to select more impactful nodes within given enclaves, and accordingly enhancing the monitoring and control activities directed to such local key nodes.

Oscillation events are one of the major issues within a power system which can damage equipment at node sites within an electrical grid, leading to collapse of an entire transmission system in some situations. Oscillations can be in various forms, such as natural oscillations, electromechanical, transient oscillations, and forced oscillations. For example, synchronous machine generation equipment in power plants may introduce harmonics into the power system and cause oscillations, typically in a frequency in ranges around 0.2-4 Hz. On the other hand, subsynchronous oscillation events around the frequency range 10-100 Hz may occur, for example, as the result of interactions between transmission networks and some controllers for renewable energy sources. Traditional PMU equipment may not have sufficient resolution to measure interharmonic phasors to detect some types of oscillation events. For example, a standard PMU device may have a sampling rate of 60 Hz, but for monitoring purposes this equates, at best, to about 30 Hz and often as low as 15-20 Hz due to data errors and filtering algorithms in current equipment. Subsynchronous oscillation detection units (SSODU) may be used instead of or in addition to traditional PMU devices to provide multi-resolution data sources and sampling frequencies.

Figure 6:
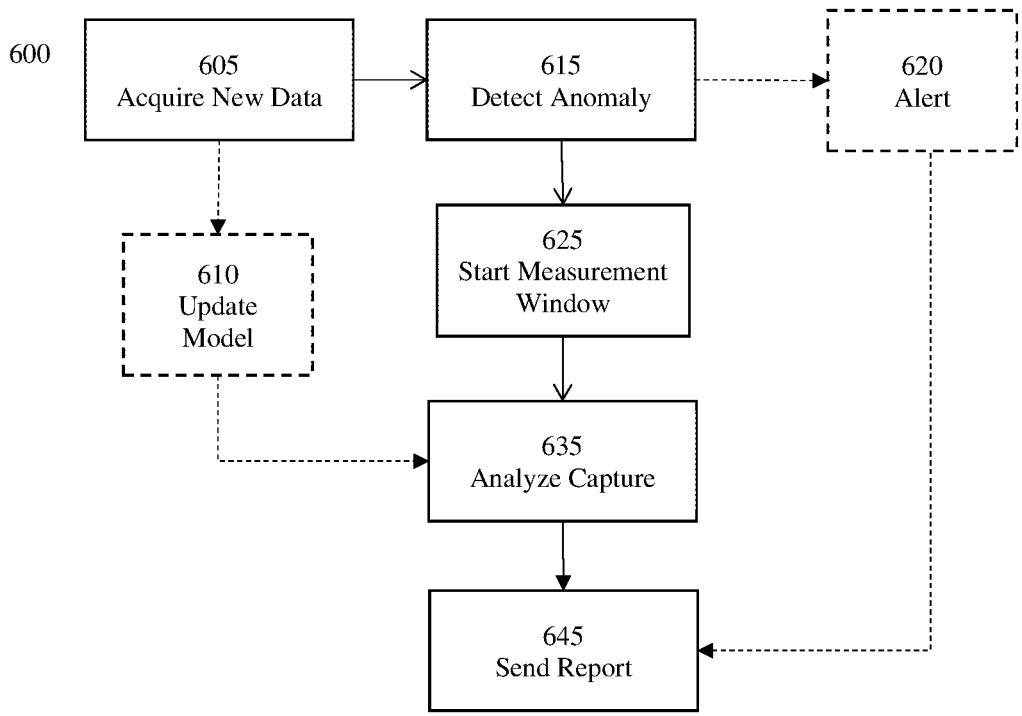
FIG. 6 is a diagram of a method for detecting power oscillation events in nodes of an electrical grid for use in the systems and methods of FIGS. 1-5.

FIG. 6 shows a block diagram for a method 600 for high-resolution sampling and detection of harmonic oscillation instabilities. In step 605, voltage sampled at a node is mapped against time values on a scale of milliseconds, for example data acquired from a PMU or more preferably an SSODU. Anomaly detection proceeds in step 615 by comparing the waveforms to expected values of the operating grid (e.g., 60 Hz), waveforms and data acquired from different devices in the grid (e.g., different channels), and/or historical models of the system behavior. In optional step 620, an alert message may be provided to system operators or command nodes in parallel to further processing and analysis. For example, an alert may be sent if the anomaly is an abrupt change in operating state even though additional information about the anomaly is not yet available. Once identified, anomaly events can be traced to particular devices and/or grid locations in further processing steps. Optionally, data samples can be provided to analysis engine for updating model in step 610 even if an anomaly is not detected and subjected to further analysis.

In step 625, further measurements are captured starting from the first peak of the detected oscillation. For example, the local oscillation may have frequencies around the range of 0.1 Hz to 2 Hz, such that one cycle of the oscillation event can be captured in about 10 seconds (i.e., if the frequency is 0.1 Hz). The captured data may then be subjected to further analysis and processing in step 635, which may take a variety of forms. In one embodiment, analysis 635 includes application and retraining of a deep learning engine based on a convolutional neural network (CNN), which is further discussed in connection with and illustrated in FIG. 7. Analysis 635 may include additional data analysis methods known to those of skill in the art to provide rapid analysis and categorization of a subject analysis event in place of or in addition to the techniques in FIGS. 7. This rapid response time improves overall grid resiliency. For example, to maintain interoperability of a power generation utility and a distribution utility, the generation utility may need to shed many megawatts of power within one minute of the anomaly in order to prevent successive events caused by the oscillation at the distribution utility, such as equipment failures. The causes or sources of an oscillation event are then reported to a command node or partner node in step 645, and these reports can be used for overall system command and control processes as described above in connection with FIGS. 1-5.

Figure 7:
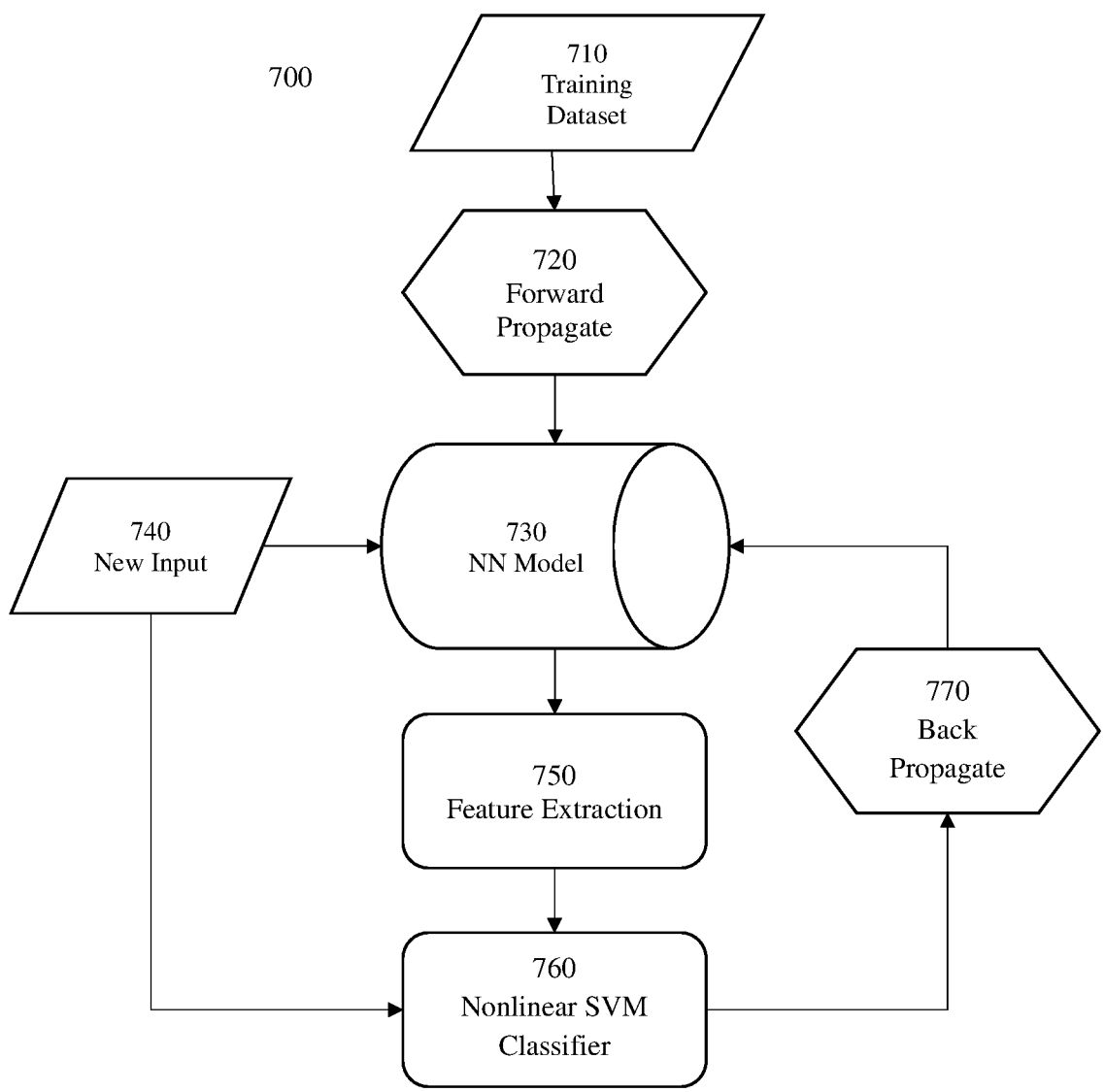
FIG. 7 is a diagram of a method for modeling and analyzing electrical grid data which may be implemented in the methods of FIG. 6.

In FIG. 7, a detailed view of the modeling process 700 is shown, which may be applied in step 635 of FIG. 6 alone or in combination with other computational processes. Training dataset 710 may be time series of data from PMU or SSODU devices and may include additional data types such as weather or other forms of Non-Operational Data, Situation Awareness Data, and Operational Data discussed above. In a forward-propagating step 720, the initial training is performed based on the training data input 710 to produce a model 730. Pertinent features of the data can be extracted from the model in step 750, which are then used to develop a classifier 760. As new data 740 is received, it is evaluated in relation to the model 730 and proceeds through feature extraction 750 and classification 760. That result may then be used to update the model 730 in back propagation step 770. Such an analysis/CNN engine may be implemented at an individual node, a partner node supervising a subset of nodes, or even at a command node aggregating data from many nodes and/or enclaves in the grid system. The model 730 may be continuously updated such that upon detection of an oscillation event, the new event can be rapidly classified according to the pre-built classification 760.

In a preferred embodiment, model 730 is a convolutional generative adversarial neural network (CGANN) algorithm. The CGANN is a combination of generative adversarial networks (GAN) and convolutional neural networks (CNN). A GAN model consists of two different neural networks; a generator G is often represented as (z), and a discriminator D is often represented as (x). The generator G is responsible for the generation of data, and the discriminator D functions to ascertain the quality of the generated data and provide feedback to generator G. Through multiple cycles, the generation and discrimination network train each other. D is trained to maximize the probability of assigning the correct label to both training examples and samples from G, and G is trained to minimize log $(1-((z)))$. The GAN approach has a number of advantages, such as the fact that the learning process does not take a great deal of time, as GANs do not require label data, and the generated data is similar to real data; accordingly, there is an inherent ability to learn complicated distribution data (grouping or the density of the observation).

The generator network and discriminator network for a GAN can be any of the neural network types. In the preferred implementation of the present disclosure, the CNN is used for a convolutional adversarial neural network (CANN). CNN has shown excellent performance for several applications, such as object detection, medical analysis, and image classification. The basic concept of CNN is to obtain local features from input at higher layers and combine them into more complex features at lower layers. To optimize the network structure and solve the unknown parameters, CNN utilizes the back-propagation algorithm. CNN is usually utilized on visual data, and if CNN is utilized on non-visual data, it is necessary to encode the data in a way that mimics the properties of visual data. CANN networks utilize convolutional layers within the generator network and discriminator network of GAN. A CANN system is a network with convolutional layers, followed by normalization or pooling layers and an activation function. In the CANN, the discriminator network takes the data and downsamples it with the assistance of convolutional and pooling layers and then utilizes a dense classification layer to predict the data. The generator network takes a random noise mechanism, and finally generates the data. A fully convolutional network is a network without fully connected dense layers at the end of the network. Instead, it consists of convolutional layers and can be end-to-end trained, such as that of a convolutional network with fully connected layers. There are no pooling layers in a generator network, while the discriminator network has fully connected layers with a classifier at the end of the layer.

The results of the CGANN may be used as a feature extractor 750 to derive key features from the input data which are then fed into a classifier 760. Preferably, classifier is a nonlinear support vector machine (SVM) classifier. SVM is a widely accepted supervised machine learning technique that is used for either classification or regression. SVM has the ability to ascertain the unknown relationship between a set of input variables and the output of the system, can be trained with quadratic programming (QP) and exhibits good learning ability for small samples. SVM can also leverage the structural risk minimization (SRM) principle to minimize the training error. The output from the feature extractor may fed into the nonlinear SVM model as inputs, while the pre-trained CNN is utilized as a starting point for new input data using a nonlinear SVM classifier. Utilizing the pre-trained CNN model, the transfer learning mechanism facilitates enhanced accuracy for new tasks. The CNN and finely tuned SVM amalgam can effectively handle nonlinear complexities and short-term dependencies of the electrical time series data.

It will be appreciated by those skilled in the art that the resilient decision systems and methods provided by this disclosure are not limited to the specific grid configurations shown in the figures or described herein, but rather that the inventions may be adapted to provide many additional power grid configurations with enhanced reliability and resiliency.

The invention claimed is:

1. A method for operating a multi-partner enclave in a power grid domain of nodes, comprising:
(i) selecting a partner node from a subset of the domain nodes based on proximity to the subset nodes and establishing a heuristic model in the partner node;
(ii) receiving non-operational data from the subset nodes in the partner node;
(iii) updating the heuristic model based on the received non-operational data;
(iv) receiving operational data from the subset nodes in the partner node;
(v) evaluating the received operational data within the partner node to identify an adjustment to an electrical property of the subset nodes by executing a compressed decision path comprising:
providing the operational data to the heuristic model to generate a heuristic vote;
providing the non-operational data to a Lower Ambiguity, Higher Uncertainty (LAHU) model to generate a Lower Ambiguity, Higher Uncertainty (LAHU) vote;
combining the heuristic vote and the Lower Ambiguity, Higher Uncertainty (LAHU) vote to generate a compressed decision vote; and
(vi) sending a command to implement the adjustment from the partner node to an electrical device in the subset nodes.

2. The method of claim 1, further comprising introducing a headquarters node in communication with the partner node, wherein the partner node receives a command from the headquarters node.

3. The method of claim 1, comprising identifying a key node in the subset nodes.

4. The method of claim 3, wherein the electrical device is located at the key node and the partner node sends the command directly to the key node.

5. The method of claim 4, wherein identifying a key node in the subset nodes comprises selecting the key node based on comparing the number of electrical customers supplied by the key node to the number of electrical customers supplied by the rest of the subset nodes.

6. The method of claim 4, wherein identifying a key node in the subset nodes comprises selecting the key node based on a pre-prioritized set of electrical customers.

7. The method of claim 1, wherein the power grid domain of nodes comprises a plurality of substations, comprising:
selecting distribution subsets of the domain nodes corresponding to the power grid components supplied by the substations; and
repeating steps (i) to (vi) for each distribution subset.

8. The method of claim 1, wherein evaluating the received operational data within the partner node to identify an adjustment to an electrical property of the subset nodes comprises applying a voting algorithm.

9. The method of claim 8, wherein the voting algorithm employs a comparator threshold.

10. The method of claim 8, wherein evaluating the received operational data within the partner node to identify an adjustment to an electrical property of the subset nodes comprises selecting a decision path based on available decision cycle time.

11. The method of claim 1, wherein the non-operational data comprises phasor measurement unit data.

12. The method of claim 1, wherein the non-operational data comprises digital fault record data.

13. The method of claim 1, wherein
combining the heuristic vote and the Lower Ambiguity, Higher Uncertainty (LAHU) vote to generate a compressed decision vote comprises comparing to an output of a historical model applied to the operational data and the non-operational data.

14. The method of claim 1, wherein the operational data comprises a series input of operational state data; and wherein evaluating the received operational data within the partner node to identify an adjustment to an electrical property of the subset nodes comprises executing an uncompressed decision path, comprising:

providing the series input of operational state data to a historical baseline model to generate a historical vote;

providing the series input of operational state data and the non-operational data to a Higher Ambiguity, Lower Uncertainty (HALU) model to generate a Higher Ambiguity, Lower Uncertainty (HALU) vote;

combining the historical vote and the Higher Ambiguity, Lower Uncertainty (HALU) vote to generate an uncompressed decision vote.

15. The method of claim 14, comprising selecting a decision output from among the uncompressed decision vote or the compressed decision vote, wherein the decision output is used to identify the adjustment.

16. The method of claim 1, comprising, after sending the command to implement the adjustment, receiving a second set of non-operational data from the subset nodes in the partner node and updating the heuristic model based on the second set of non-operational data.

17. The method of claim 1, comprising establishing a historical model in the partner node and updating the historical model based on the received operational data.

18. The method of claim 17, comprising after sending the command to implement the adjustment, receiving a second set of operational data from the subset nodes in the partner node and updating the historical model based on the second set of operational data.

19. The method of claim 18, comprising, after sending the command to implement the adjustment, receiving a second set of non-operational data from the subset nodes in the partner node and updating the heuristic model based on the second set of non-operational data.

20. The method of claim 19, wherein evaluating the received operational data within the partner node to identify an adjustment to an electrical property of the subset nodes comprises selecting a decision path based on available decision cycle time.

* * * * *